(12) United States Patent
Shapoury et al.

(10) Patent No.: US 9,711,833 B1
(45) Date of Patent: Jul. 18, 2017

(54) TUNABLE RF ANTI-JAMMING SYSTEM (TRAJS)

(71) Applicant: Physical Optics Corporation, Torrance, CA (US)

(72) Inventors: Alireza Shapoury, Rancho Palos Verdes, CA (US); Daniel Mark Bock, Los Angeles, CA (US); Andrew Kostrzewski, Garden Grove, CA (US); Thomas Nielsen, Torrance, CA (US)

(73) Assignee: Physical Optics Corporation, Torrance, CA (US)

( * ) Notice: Subject to any disclaimer, the term of this patent is extended or adjusted under 35 U.S.C. 154(b) by 552 days.

(21) Appl. No.: 14/169,078

(22) Filed: Jan. 30, 2014

Related U.S. Application Data

(60) Provisional application No. 61/759,288, filed on Jan. 31, 2013, provisional application No. 61/759,304, filed on Jan. 31, 2013.

(51) Int. Cl.
| | |
|---|---|
| *H04B 1/10* | (2006.01) |
| *H01P 1/203* | (2006.01) |
| *H01P 5/12* | (2006.01) |
| *H01P 1/22* | (2006.01) |
| *H01P 7/08* | (2006.01) |
| *H04B 1/26* | (2006.01) |

(52) U.S. Cl.
CPC .............. *H01P 1/203* (2013.01); *H01P 1/22* (2013.01); *H01P 5/12* (2013.01); *H01P 7/082* (2013.01)

(58) Field of Classification Search
CPC .... H04B 1/1036; H04B 1/1063; H03H 9/547; H03H 9/6409; H03H 11/18; H03H 17/025; H03H 21/0021; H03H 2011/0488
USPC ........................................ 455/303, 304, 306
See application file for complete search history.

(56) References Cited

U.S. PATENT DOCUMENTS

| | | | |
|---|---|---|---|
| 6,636,128 B2 * | 10/2003 | Rauscher | H03H 7/0123 333/174 |
| 8,644,896 B1 * | 2/2014 | Bock | H01P 1/2039 333/204 |
| 2008/0266020 A1 * | 10/2008 | Nosaka | H01P 5/10 333/26 |

(Continued)

*Primary Examiner* — Lee Nguyen
(74) *Attorney, Agent, or Firm* — Sheppard, Mullin, Richter & Hampton LLP; Daniel Yannuzzi

(57) ABSTRACT

Systems and methods are provided for tunable band pass filtering for Tunable RF Anti-Jamming Systems. A tunable notch filter includes a transmission line coupled to an antenna, a splitter, a band-stop filter, a polarity inverter, and a combiner. In operation, the band-stop filter suppresses predetermined frequency bands of a received signal creating a filtered signal, the polarity inverter creates an inverted signal, and the combiner combines the filtered and inverted signals to create a pass band including the predetermined frequency bands and suppressing frequency bands adjacent the predetermined frequency bands. Alternatively, a tunable multiband bandpass filter includes first and second bandpass filters and a plurality of tunable passive components adapted to tune the first and second bandpass filters to first and second frequency bands, thereby creating a multiband pass band signal including the first and second frequency bands and attenuating frequency bands adjacent to the first and second frequency bands.

11 Claims, 16 Drawing Sheets

(56) References Cited

U.S. PATENT DOCUMENTS

2014/0323076 A1\* 10/2014 Kintis ................. H04B 1/1036
　　　　　　　　　　　　　　　　　　　　　　455/307

\* cited by examiner

TUNABLE RF ANTI-JAMMING SYSTEM (TRAJS)

CROSS-REFERENCE TO RELATED APPLICATIONS

This application claims the benefit of U.S. Provisional Application Nos. 61/759,288, titled Tunable Band Pass Filter based on Reflective Notch and filed on Jan. 31, 2013; and 61/759,304, titled Activated Tunable Dual-Band Band-Pass Filter and filed on Jan. 31, 2013.

ADDITIONAL SUPPORT

This application is supported in part by United States Navy Contract No. N68936-08-C-0029.

DESCRIPTION OF RELATED FIELD

The systems and methods described herein relate generally to filters for communication systems, and more particularly, some embodiments relate to tunable anti-jamming filters.

BACKGROUND

The high power interference regime produced during Electronic Warfare (EW) operations creates a challenging electromagnetic environment for robust communication. This undesirable situation is exacerbated by the presence of intentional interferers, such as those present in the theater of war. Accordingly, communication and data link transceivers should ideally be able to operate in the presence of high-power, adjacent-channel interference. However, achieving the isolation necessary for adjacent channel operation requires layered interference mitigation techniques, including in both the digital and analog domains. Unfortunately, in spite of significant advancements of technology in digital domain, the analog domain has not improved significantly. Therefore, despite the advancements of digital technologies, there is a pressing need for RF signal conditioning and ant-jamming filter systems.

In the digital domain, components such as DSPs (Digital Signal Processors) and FPGAs (Field-Programmable Gate Arrays) have matured in recent decades. Such devices perform very effective signal conditioning, detection and estimation, typically after the signal has been filtered with a suitable band selection filter. However, the band selection itself in the analog domain has not kept pace with the digital advancements, especially in the transition RF range between lumped and distributed technologies (e.g., 10 MHz to 4 GHz). For C4ISR (Command, Control, Communications, Computers, Intelligence, Surveillance and Reconnaissance) operation, in particular, systems must be able to receive a weak signal in the presence of a strong interfering signal and still achieve optimal sensitivity above the thermal noise background. To this end the transceiver ideally will have a dynamic range, $D_r$, of: $D_r = P_I/(S_N BW) = P_I/kT\ BW)$, where: BW is the bandwidth, $P_I$ is the interference power, and $S_N = kT$ is the noise floor (i.e., noise power per degree of freedom). Therefore, for a given bandwidth of BW, a higher power in the bandwidth of operation translates to higher requirement for dynamic range, $D_r$. This is, however, not feasible given >100 dB of typical power difference between a typical C4ISR signal of interest and the transmit power of cosite transmitters.

To exemplify this, the acceptable power is <1 mW at analog-to-digital converters in almost all advanced radios (10 mW is preferred). Even a commercial 3G cell phone's own transmitted signal of around 300 mW impinges on the received signal, requiring preselect filters and diplexers. Unfortunately, the existing compact preselect filters have fixed band frequencies (and, have high losses), while, solutions that demand low loss (e.g., in radar applications) are bulky and still non-tunable. Therefore, there is demand for low-loss solutions that are both compact and tunable.

Patent application Ser. No. 12/960,363, responded to this demand using a band-stop filter component concept.

BRIEF SUMMARY OF EMBODIMENTS

Various embodiments of the technology disclosed herein relates to tunable band-pass-filter technology suitable for use with Tunable RF Anti-Jamming Systems (TRAJSs). In various embodiments, this technology can be implemented to combine low-loss, compact TRAJS devices and methods, based on both reflective notch filtering and activated dual band filtering.

Embodiments of the technology disclosed herein can be implemented to include the following novel features: (1) High agility of filtering (e.g., approaching 1 µs switching time; (2) High compactness and planar geometry; (3) Low insertion loss (e.g., achievable: 0.1 dB-1.0 dB); (4) High notch depth (e.g., achievable: −100 dB); and (5) Broad RF Range (e.g., 10 MHz to 4 GHz). The inventors are unaware of any prior-art tunable filter technology that can achieve these five (5) features in combination. The HIPTAN band stop filter consists of edge coupled microstrip resonator rings which are electronically tuned using available variable capacitors. These ring resonators have hybrid (lumped/distributed) elements and do not follow the commensurate ring resonator structures and hence are substantially more compact than the prior art quarter wavelength ring resonators. Each filter can consist of several rings to optimize the collective filter characteristics with respect to the filter skirt slope and the in-band rejection loss.

This tunable band pass filtering technology can be categorized into two basic groups of embodiments. The 1$^{st}$ group includes reflective (R) notch based tunable band pass filtering and the 2$^{nd}$ group includes activated tunable Dual Band (DB) band pass filtering.

The 1$^{st}$ group, the reflective (R) group, is based on a novel reflective notch filter design and wave front polarity inversion, and may include the following specific features:

- Placed ahead of the front end (e.g., mixer) in a receiver, and has band pass characteristics such that the desired (tuned) electromagnetic (e.m.) transmit/receive signals are allowed to pass, while, other undesired signals (including the image frequencies) are attenuated.
- Improves transmitter/receiver (Tx/Rx) performance for reduced insertion loss (e.g., ~1 dB), large tuning range (e.g., >two octaves), high power handling (e.g., >1 kW out-of band vs. 100 W in-band), and high tuning speeds (e.g., approaching 1 µsec, operating in frequency range from 30 MHz to 20 GHz).
- Tunable notch filter uses power combiner/splitter and polarity inverter as well as other integrated structures. capability to adjust the reflective power and in addition efficiently operates in the so-called "awkward" RF frequency spectrum of 100 MHz-1 GHz, where the wavelength is rather long for compact realization while lumped-element parasites become objectionable.

Low insertion loss of the band-pass filter allows for serial cascading of the structure to achieve steep skirts, i.e., higher roll-off ratio at the shoulder of the passing bands. The filter can also be tuned by adjusting the resonant frequency of the notch or band stop filter.

The 1$^{st}$ R-group opportunistically uses the reflective loss of tunable band stop filter to reduce the overall insertion loss of the band pass filter, when both band stop and band pass filter technologies are integrated, resulting in unprecedented filtering performance using intentionally degraded band stop filter such as notch filter.

In comparison with conventional filtering solutions, which use rather fixed band static filters or low power tunable filters with a tuning speeds of only milliseconds, the systems and methods disclosed herein can be configured to increase the flexibility of communication systems by providing digital tuning of a highly selective filter at speeds near 1 μsec with high power handling of up to 1 kW.

The 2$^{nd}$ Group, the Dual Band (DB) group, is based on a novel dual-band filter structure and can be implemented with the capability to be configured for multiband operation and further electronically tuned and deactivated or activated if needed. This filter is placed ahead of the front end (e.g., mixer or downconverter) in a receiver, and has band-pass characteristics such that desired (tuned) electromagnetic Tx/Rx signals are allowed to pass while other undesired signals (including the image frequencies) are attenuated. The filter offers real-time adjustment of two channels, independently, using passive tunable components such as variable capacitors.

The filter can be configured in various embodiments to have a hybrid structure consisting of lumped elements, and a distributed structure and may include two standard connector-equipped ports, which can be connected to the antenna and the front end of the Tx/Rx section. The filter distributed structures form two resonators, which are governed by passive tunable elements. In some embodiments, each of the resonating modes corresponds to one of the two pass bands. The use of a low insertion loss filter (e.g., insertion loss of 0.1-1 dB) allows for serial cascading of the structure to achieve steep skirts; i.e., higher roll-off ratio at the shoulder of the passing bands. The single stage filter offers a roll-off of greater than −80 dB/decade. The filter can be designed and adjusted to form either Butterworth or Elliptic types of responses with degrees >4.

The filter at each or both bands can also be deactivated by shifting to resonant modes to the spectra that exhibit high attenuation either in the lower band or higher bands with respect to the filter's operational spectral support. At these attenuating spectra, the filter acts as a terminated load (i.e., off switch). Therefore, the tunability and activation at low insertion loss is the fundamental characteristics of this filter. Also, the filter consumes little power during wideband operation. This is because the tunable elements draw power in the range of 10 mW during the operation when the tunability is −10%, the fractional bandwidth of the operational spectrum.

In summary, the high power interference regime produced during Electronic Warfare (EW) operation, in particular in the presence of intentional interferers in the theater of war, creates a challenged electromagnetic environment for robust communication. These communication and data link Tx/Rx are preferably configured to be able to operate in the presence of high-power adjacent-channel interference. Achieving the isolation necessary for operation with adjacent-channel interference in some applications requires layered interference mitigation techniques such as pass band filtering based on reflective notch (R-Group) and on dual band (DB-Group) filtering, such as those presented in here.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 18, which comprises

Figure 1:
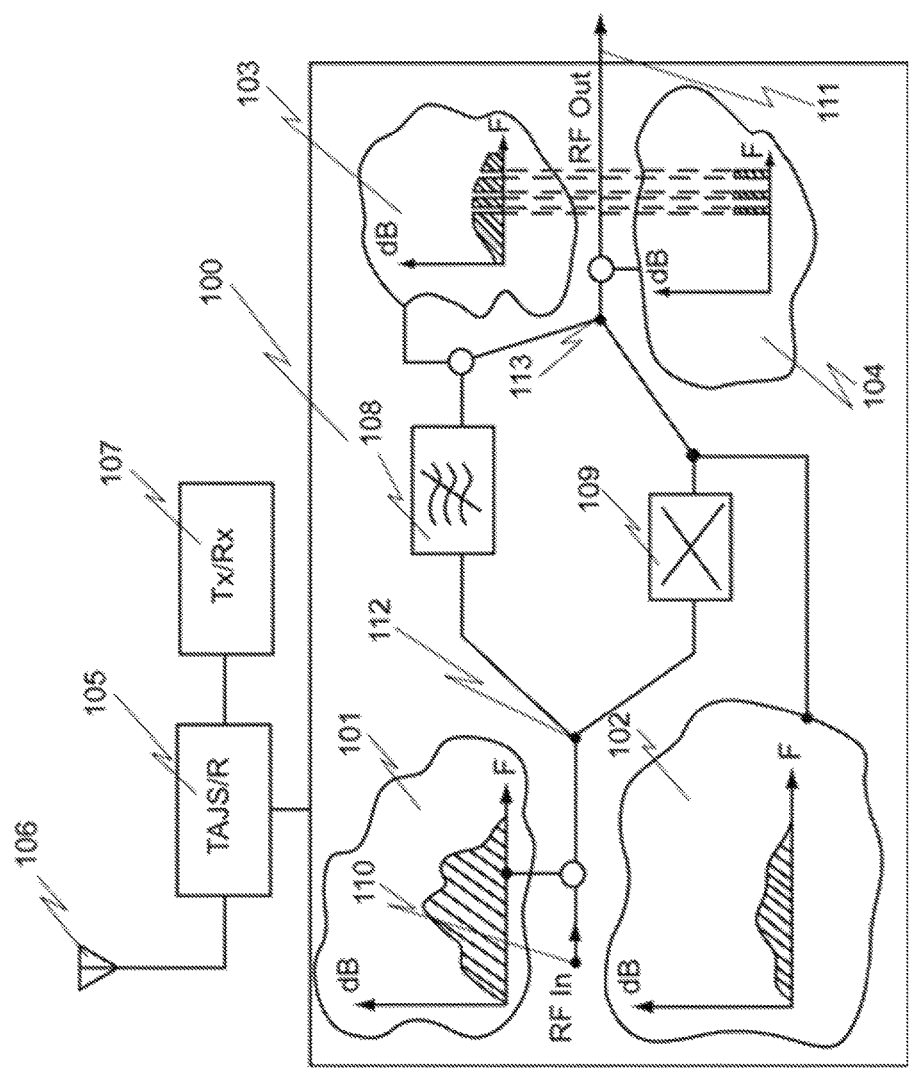
FIG. 1 is a diagram illustrating building blocks of an example filter in accordance with one embodiment of the systems and methods described herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

| Table of Contents | |
|---|---|
| CHAPTER 1. TUNABLE RF BAND PASS FILTER BASED ON REFLECTIVE NOTCH (TRAJS/R) | 11 |
| 1.1   The Filter Architecture | 11 |
| 1.2   Attenuating and Selective Resonator Rings | 12 |
| 1.3   Band Pass Filter | 13 |
| 1.3.1   Power budget and the Reflective Band Stop Filter-Configuration without Power Reflection | 15 |
| 1.3.2   Power Budget and the Reflective Band Stop Filter-Configuration with Power Reflection | 16 |
| 1.4   The Power Splitter/Combiner and the Polarity Inventor System Components | 18 |
| 1.4.1   Wilkinson Power Divider/Splitter and Other Conventional Components | 18 |
| 1.4.2   Microstrip-Based | 18 |
| 1.4.3   Microstrip Line Ring-Based | 20 |
| 1.4.4   Coplanar-Based | 20 |
| 1.5   Noise FIG. and EMI Packaging | 21 |
| 1.6   Systemic Approach | 21 |
| CHAPTER 2. ACTIVATED TUNABLE RF DUAL BAND BAND-PASS FILTER (TRAJS/DB) | 21 |
| 2.1   Filter Structure | 22 |
| 2.2   Filter Input Output Coupling Structures | 22 |
| 2.3   Even and Odd Mode Excitations | 23 |
| 2.4   Controlling of the Pass Bands | 24 |

Section 1. Tunable RF Band Pass Filter Based on Reflective Notch (TRAJS/R)

1.1 The Filter Architecture

Tunable RF Anti-Jamming System (TRAJS), or TRAJS/R, in various embodiments includes a Tunable RF Band Pass Filter based on a Reflective Notch. The TRAJS/R system is a filter that can be placed after the high power amplifier in a transmitter. This filter system has band pass characteristics such that undesired electromagnetic signals are blocked, while allowing the signal of interest (SoI) to pass. The TRAJS/R in various embodiments is based on a tuned coupled resonator structure with a controller that dynamically controls the filter in both the spectral and temporal domains.

In some embodiments, the main building block of the filter is a tunable notch filter. The filter can be based on a low SWaP (i.e., low: size/weight/power) manufacturable and functionally proven planar filter technology. For the band-pass application (as in this case), the same filter block can be used in an innovative structure using an equal power splitter/combiner and a distributed network polarity reversal element.

Two types of ring resonators can be used in the tunable notch filter: attenuator rings and the selective rings. The attenuator rings provide low in-band rejection but very low reflected power. The selective rings have a higher in-band attenuation effect but also result in a higher reflected power. In band-stop attenuation, the attenuation rings precede the selective rings to attenuate the reflective power at the notched frequencies, protecting the high power amplifier while the selective rings provide a deep selective notch. Therefore, by combining these rings both the reflected power and notch depth can be adjusted. This can be done by tuning the rings in and out of the relevant frequency bands and/or activating the additional blocks.

In this configuration, the drawback of using a splitter/combiner is minimized. In particular, the 50/50 insertion loss is minimized by controlling a reflective notch filter. This is further described herein and shown through simulations.

FIG. 1 is a diagram illustrating building blocks of an example filter in accordance with one embodiment of the systems and methods described herein. In the example shown in FIG. 1, a TRAJS/R block diagram is presented, 100. The spectral responses at different transmission points are also shown in the figure, including spectral response curves 101 and 102 at the input points, and spectral response curves 103 and 104 at the output points. The TRAJS/R band pass filter can be dynamically tuned or pre-tuned to different or to the same frequency bands for transmitters and receivers.

The example TRAJS/R block diagram of FIG. 1 can be used as part of a general anti-jamming system, including: TRAJS/R 105 in a communication transceiver, which includes an RF antenna 106 and a TX/RX block 107. In the illustrated example, the TASJ/R 105 is ahead of the TX/RX block 107. Also shown in FIG. 1 is an expanded view 100 of TASJ/R 105. The example TRAJS/R block 100 includes a band stop filter 108, a wavefront inverter 109, as well as RF in 110 and RF out 111. The basic architecture 100 also includes a wavefront splitter 112 and a combiner 113. Although response curve 102 is generated from the original signal (represented by spectral response curve 101) after spectral conditioning or filtering, its instantaneous phase measured at each Fourier tonal constituent is reversed with respect to that of the original signal.

1.2 Attenuating and Selective Resonator Rings

Figure 2:
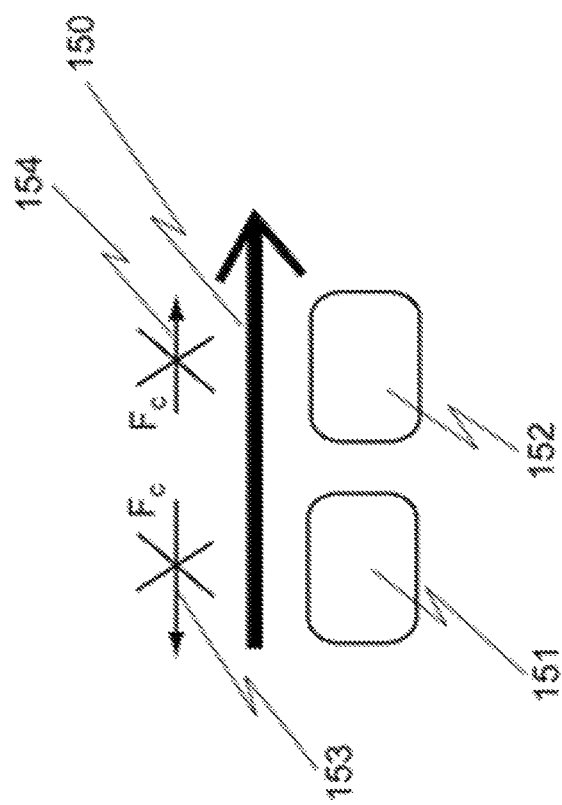
FIG. 2 is a diagram illustrating an example configuration for attenuation and selective rings in accordance with one embodiment of the technology described herein.

As described above, in various embodiments, two types of resonators can be used in the TAJS/R system for band stop filter 108. These are attenuation rings and the selective rings. FIG. 2 is a diagram illustrating an example configuration for attenuation and selective rings in accordance with one embodiment of the technology described herein.

In this figure, the attenuation ring 151 and selective ring 152 are located close to transmission line 150. In the example shown in FIG. 2, the attenuating and selective ring resonators 153 and 154, respectively, are elements of the band stop filter block 108 as in FIG. 1, to block the reflection and insertion signals at the center frequency, $F_c$. Although the attenuator rings resonate at the notched frequencies, their in-band rejection is not as high as that of selective rings. The selective rings shift out the main portion of the in-band signal by attenuating loading structure. In pure bandstop operation, the attenuation rings precede the selective rings to attenuate the detrimental reflective power at the notched frequencies back to the RF front end of the transmitter. For a particular application, we can activate both the in-band reflective power and the insertion loss by tuning the rings and/or activating additional blocks. As we discuss in the next section, by judicious choice of filter architecture, we benefit from controllability in in-band reflective power to reduce the insertion loss (of the power splitter/combiners) in the bandpass operation.

1.3 Band Pass Filter

Figure 3:
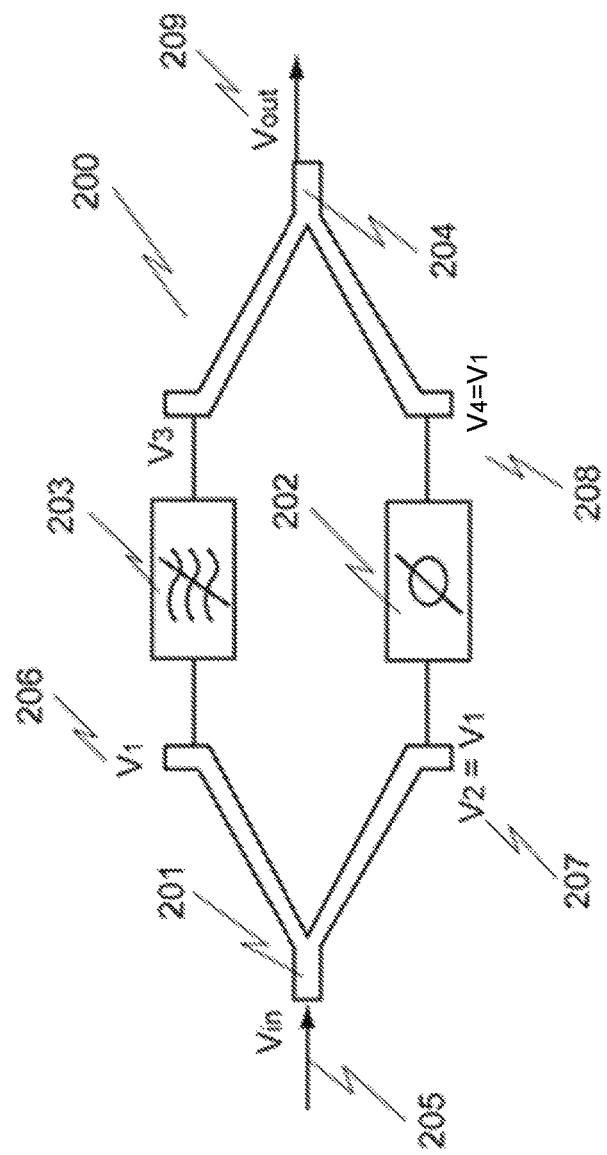
FIG. 3 is a diagram illustrating an example configuration using a similar example to that shown in FIG. 1.

The TRAJS/R band pass filter includes an equal power splitter, a polarity inverter and the band stop filter. The filter block diagram is shown in FIG. 3 using a similar example to that shown in FIG. 1, but with signal voltages added to the drawing. The band-pass-filter system 200 in this example includes of 50/50 power splitter 201, polarity inverter 202, band stop filter 203, and power combiner 204. In this system, the input signal, $V_{in}$, denoted as 205, is equally split to two identical or substantially identical signals. These are signal $V_1$ 206 and $V_2$ 207, where: $V_1 = V_2$.

In operation, $V_1$ signal 206 passes through tunable notch filter 203 thereby removing the desired in-band spectrum. The resultant signal is shown as $V_3$. The other signal from the splitter, $V_2$ signal 207, passes through a polarity inverter 202, which, in one embodiment, phase shifts the signal by 180°. Phase shifted signal $V_4$ is equal to, or substantially equal to, the inverse of $V_1$, which is $-V_1$, denoted by 208. Both signals $V_3$ and $V_4$ are combined together by combiner 204, resulting in output signal, $V_{out}$ 209. The in-band signal elements survive the addition, while the out-of-band signals cancel out at the power combiner 204. This results in desire band, represented by output signal, $V_{out}$, denoted by 209, where: $V_{out} = V_3 = V_1$, as in FIG. 1, where desired band is denoted by 104. The block diagram, as in FIG. 3, is further specified below.

Figure 4:
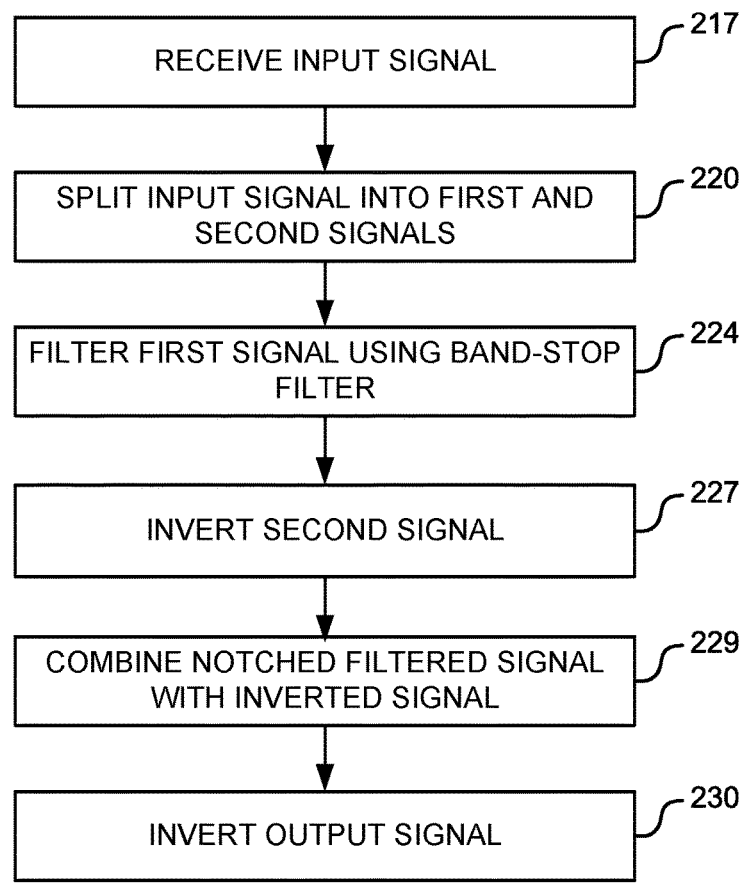
FIG. 4 is a diagram illustrating an example process for TRAJS/R band pass filtering in accordance with one embodiment of the systems and methods described herein.

FIG. 4 is a diagram illustrating an example process for TRAJS/R band pass filtering in accordance with one embodiment of the technology described herein. The process can be seen as illustrated by the spectral curves in FIG. 1 and the basic architecture shown in FIGS. 1 and 3. Referring now to FIGS. 1, 3 and 4, at operation 217, the input signal is received. For example, original input signal 101 is received as shown in FIG. 1. The original input signal can be an RF signal received through the antenna 106. At operation 220, input signal $V_{in}$ is split into two signals by splitter 201. The resultant two signals are shown in FIG. 3 has $V_1$ and $V_2$. Because the signal power is split between the two branches, the signal level (e.g., amplitude) of the input signal is reduced or absent any amplification. For example, with a 2-way splitter 201, the input signal is typically reduced by approximately 3 dB.

At operation 224, the first signal $V_1$ is filtered using band-stop filter 203 (108 in FIG. 1). Band-stop or notch filter 203 can be configured to prohibit passage of one or more frequency bands of a determined bandwidth. In other words, to attenuate by desired amount the one or more determined frequency bands. The resultant signal $V_3$ is a notched signal with the one or more determined frequency bands effectively removed (or attenuated). An example of this is shown by signal curve 103, which illustrates 3 frequency bands removed from the signal's frequency spectrum.

At operation 227, the second signal $V_1$ output from the splitter 201 is inverted resulting in an inverted, but attenuated version of the input signal $V_{in}$. This is illustrated in FIG. 3 as $V_4$, which is equal or substantially equal to $-V_1$. At operation 229, the notched filtered signal $V_3$ is combined with inverted signal $V_4$ by a combiner 204. When the inverted input signal $V_4$ is added to $V_3$ all but the in-band signal portions cancel, resulting in the desired pass-band spectrum (shown by curves 104). At operation 230, the output signal can be inverted so that the resultant in band signals are positive as shown at 104.

In summary, the band pass filter system, 200, operates based on a differential mode operation, where the input signal is subtracted from its notched replica, and the remaining passband portion of the input signal (i.e., the desired band) (e.g., denoted by 104, in FIG. 1) is output from the filter.

Figure 5:
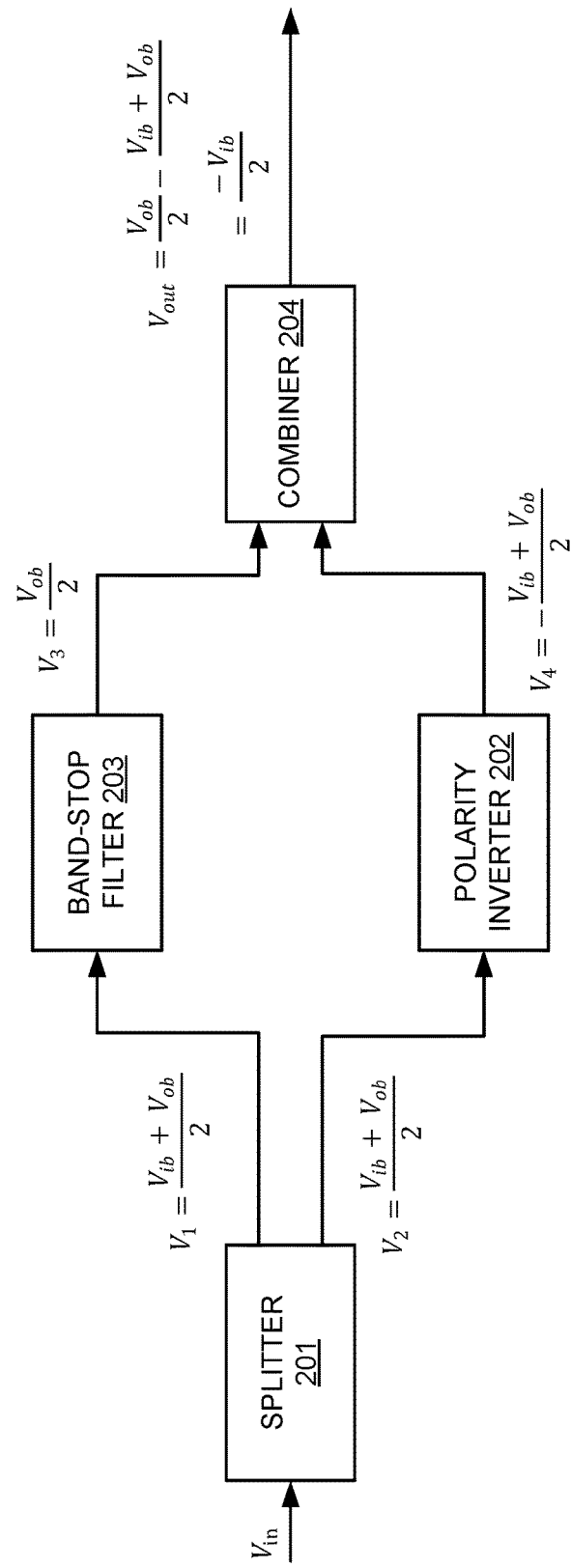
FIG. 5 is a diagram illustrating a signal configuration for the example TAJS/R of FIG. 3, but with signal amplitudes listed in more detail, including in-band signals with index, "ib," and out-of-band signals with index, "ob."

1.3.1 Power Budget and the Reflective Band Stop Filter-Configuration without Power Reflection FIG. 5 is a diagram illustrating the signal configuration for the example TAJS/R of FIG. 3, but with signal amplitudes listed in more detail, including in-band signals with index, "ib," and out-of-band signals with index, "ob." Referring now to FIG. 5, in this example, band-stop filter 203 is selected as having a high reflection loss. For example, in some embodiments a reflection loss of greater than 10 dB is selected. However, in other embodiments, a reflection loss of 5-8 dB is suitable. Assuming an ideal, non-reflecting band-stop filter 203, the insertion loss due to splitter 201 and combiner 204 is typically 3 dB or greater. As seen in FIG. 5, the signal levels at $V_1$ 206 and $V_2$ 207 are approximately half the level of $V_{in}$ 205. These are given by the following, in which the voltages $V_x$ are complex values having both an amplitude and a phase component.

$$V_1 = \frac{V_{ib} + V_{ob}}{2}$$

$$V_2 = \frac{V_{ib} + V_{ob}}{2}$$

$$V_3 = \frac{V_{ob}}{2}$$

$$V_4 = -\frac{V_{ib} + V_{ob}}{2}$$

$$V_{out} = \frac{V_{ob}}{2} - \frac{V_{ib} + V_{ob}}{2} = \frac{-V_{ib}}{2}$$

If the additional insertion loss of the notch filter 203 itself is also included, the overall insertion loss will be about 4 dB, which is still less than typical conventional tunable filters (which are usually >5 dB). However, such a solution may have difficulty handling high power signals. Therefore, a more optimal solution, capable of handling high power signals, is presented below.

Figure 6:
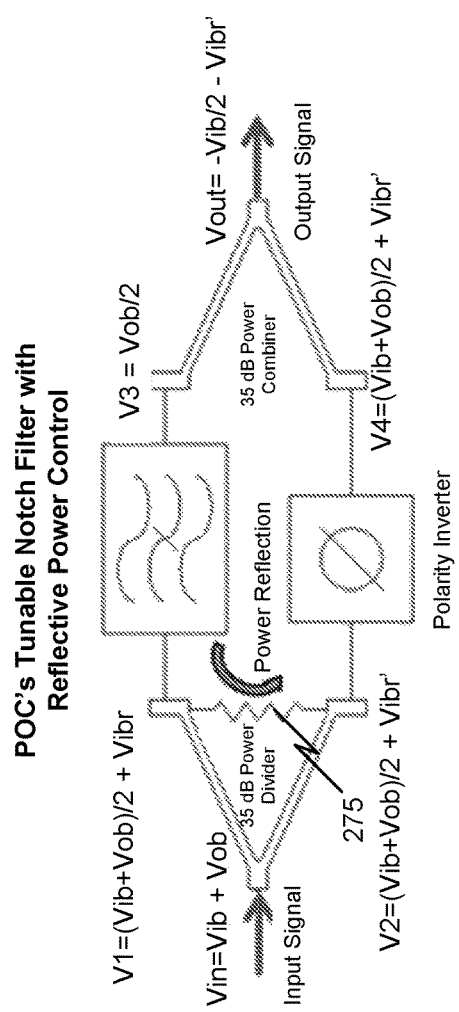
FIG. 6 is a diagram illustrating a more optimal power budget solution in various embodiments. This example includes a signal path 275 coupled between nodes 206 and 207.

1.3.2 Power Budget and the Reflective Band Stop Filter-Configuration with Power Reflection FIG. 6 is a diagram illustrating a more optimal power budget solution. For clarity of illustration, some of the reference characters have been omitted from FIG. 6. However, components of FIG. 6 will be described using reference characters of their corresponding components in FIG. 3.

This example includes a signal path 275 coupled between nodes 206 and 207. In various embodiments, this signal path is a resistive signal path. In such a configuration, in which the in-band reflection loss, $V_{ib_r}$, is fed back through the power reflector/splitter to the other branch and hence appears in the summation point in the power combiner. As shown in FIG. 5, $V_{in}$ is the same, and includes both the in-band and out-of-band components.

$$V_{in} = V_{ib} + V_{ob}$$

With a high-reflective power filter 203, the reflected signal component becomes a more significant component of $V_1$. Accordingly, $V_1$ includes the portion of $V_1$ from the splitter ($V_{ib}+V_{ob}/2$), plus the reflected in-band signal $V_{ib_r}$. This is the in-band reflected power at the node.

$$V_1 = \frac{V_{ib} + V_{ob}}{2} + V_{ibr}$$

Likewise, at node 207, $V_2$ includes the portion of $V_1$ from the splitter $$\left(\frac{V_{ib} + V_{ob}}{2}\right),$$

plus the reflected in-band signal $V_{ib_r}'$ that has passed through signal path 275.

$$V_1 = \frac{V_{ib} + V_{ob}}{2} + V_{ibr}'.$$

$V_3$ can be essentially unaffected by the reflected power signal path 275, and can remain $$V_3 = \frac{V_{ob}}{2}.$$

Polarity inverter 202 inverts both the original component and the reflected component, resulting in an inverted signal at $V_4$.

$$V_4 = -\frac{V_{ib} + V_{ob}}{2} - V_{ibr}'.$$

Which results in output:

$$V_{out} = \frac{V_{ob}}{2} - \frac{V_{ib} + V_{ob}}{2} = \frac{-V_{ib}}{2}.$$

This example assumes that the in-band insertion loss of the power combiners/dividers and the polarity inverters are zero. In the real world scenarios, however, these components exhibit in-band loss, which nonetheless can be partially compensated by controlling the reflective filter, thus, resulting in the overall losses of about 1-2 dB; i.e., less than 3 dB.

Figure 7:
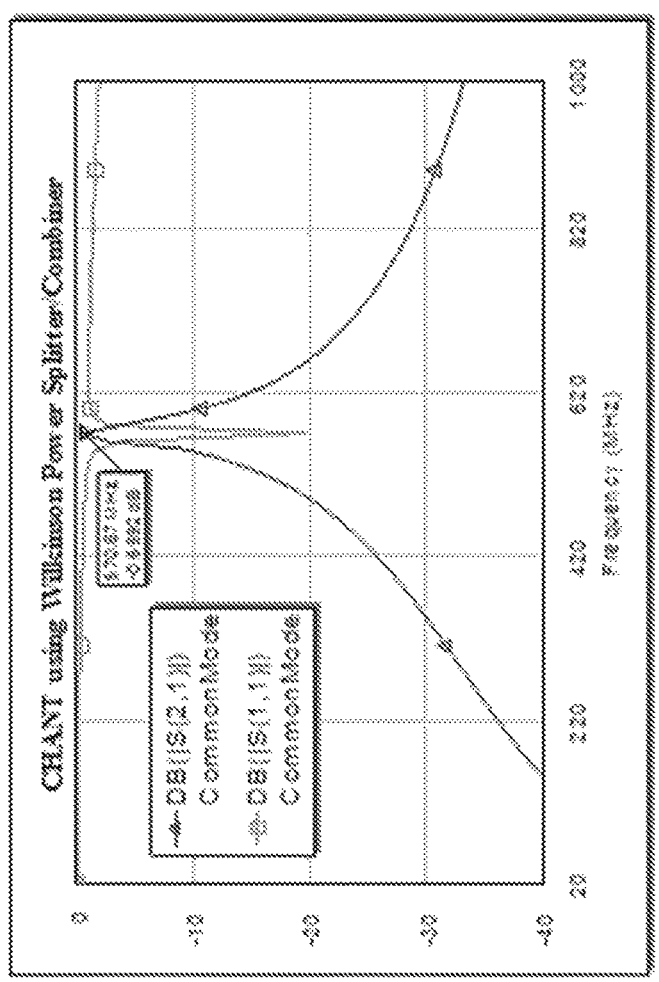
FIG. 7 shows a computer simulation of the circuit of FIG. 6 based on a model that assumes insertion losses. The simulation used a commercial Wilkinson power divider, and assumed that insertion loss is low using reflective filters.

FIG. 7 shows a computer simulation of the circuit of Figure based on a model that assumes insertion losses. The simulation used a microstrip-based, ideal Wilkinson power divider and combiner as an example. We see that the overall insertion loss, 0.66 dB, is lower than 3 dB (as it would be using FIG. 4 circuit), thus, confirming the reality of the optimal configuration, as in FIG. 5. This result is obtained at center frequency of 570 MHz, which is an arbitrary RF frequency, selected only for purposes of providing an example.

1.4 The Power Splitter/Combiner and the Polarity Inverter System Components

In this section, various component embodiments are discussed related to the Tunable RF Anti-Jamming System (TRAJS) R-Group (i.e., the TRAJS/R system, or Reflective Band Pass Filter system). In particular, these various embodiments illustrate example selections of the power splitter/combiner 203 and the polarity inverter 204.

1.4.1 Wilkinson Power Divider/Splitter and Other Conventional Components

Embodiments of the TRAJS/R anti-jamming system can be configured as a novel combination of conventional configurations and may provide both the combiner/splitting and the phase reversal required in the TRAJS/R system. One embodiment uses the well-known Wilkinson power divider/combiner and a polarity inverter distribution network. This was used in the computer simulation (FIG. 7). Another option is to use the Wilkinson power divider/combiner and a delay line measured to provide a 180° delay as the polarity phase reversal unit 202.

In general, the power dividers/combiners are preferred to be nonreciprocal networks, since their ideal implementations are lossless. Among other available topologies appropriate for TRAJS/R system, are: the hybrid rat-race or hybrid ring coupler, the waveguide magic T, and a reflectometer.

1.4.2 Microstrip-Based

Figure 8:
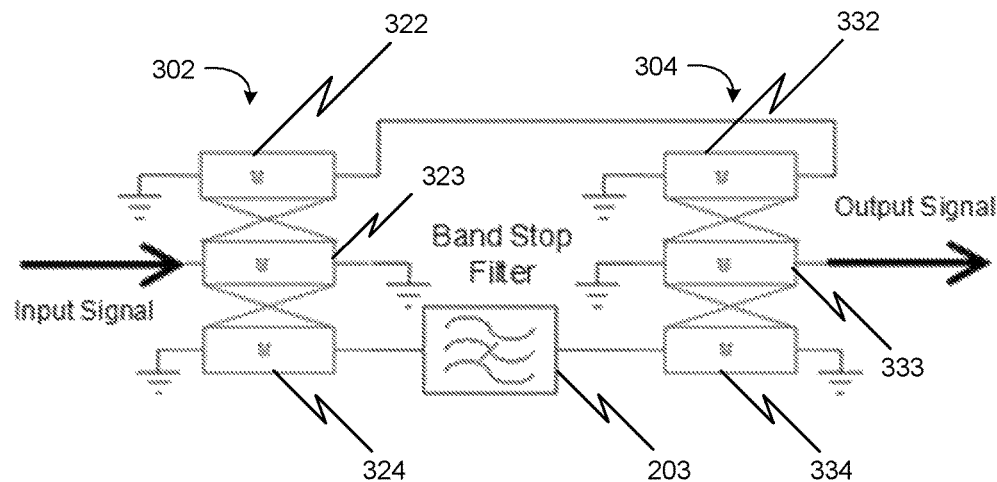
FIG. 8 is a diagram illustrating an example TRAJS/R using triple line edge coupled microstrips in accordance with one embodiment of the systems and methods described herein.

Embodiments can also be configured to use a triple line-edge-coupled microstrip for the polarity inverter 202, power splitter 201, and combiner 204. FIG. 8 is a diagram illustrating an example TRAJS/R using triple line edge coupled microstrips 302, 304 in accordance with one embodiment of the technology described herein. The triple line-edge-coupled microstrip 302 in this example comprises three separate conductive striplines 322, 323, 324, operating as coupled-line shorted stubs, arranged in parallel or substantially parallel configuration, and separated from one another via a dielectric material. Similarly, the triple line-edge-coupled microstrip 304 in this example comprises three separate conductive striplines 332, 333, 334, arranged in parallel or substantially parallel configuration, and separated from one another via a dielectric material. In various embodiments, the length of the shorted stub is a function of the operational spectrum of the filter structure.

The input signal $V_{in}$ is injected into center stripline 323 and couples to the outer striplines 322, 324 via the dielectric. The output of stripline 324 is connected to band-stop filter 203, which performs the functions as described above (e.g., suppressing one or more designated frequency bands). The output of band-stop filter 203 is connected to stripline 334 of triple line-edge-coupled microstrip 304. The output of stripline 322 is connected to stripline 332 of triple line-edge-coupled microstrip 304.

The signals coupled to striplines 332 and 334 are coupled to and combined in stripline 333 and output as output signal $V_{out}$. The effect of triple line-edge-coupled microstrip 304 is to add the input signal as coupled to stripline 332 with the band-pass-filtered signal on stripline 334. These three striplines or stubs 332, 333 and 334, which are shorted at one end, are used to realize the combining by the edge-coupling mechanism. The polarity of the signal combining is determined through the non-shorted end of striplines. Because the input to stripline 332 is at the opposite end as compared to the input to stripline 334, the effect is equivalent to essentially subtract (or combine with an opposite polarity) the waveforms feeding striplines 332 and 334 to achieve the resulting signal coupled into stripline 333.

Although the shorted stubs in triple line-edge-coupled microstrips 302 and 304 can be modeled in isolation as either inductors or capacitors (depending on their lengths), the coupling mechanism in edge-coupled microstrips is primarily capacitive as a result of there being two electrodes with a dielectric between them. Therefore the coupled currents in the stubs lead the propagating voltage by 90 degrees at each of these divider and the combiner structures (302 and 304). This results in a 180-degree phase shift (90+90=180) for the propagating signal passing through striplines 322 and 332, and a zero-degree phase shift (90–90=0) for the propagating signal passing through striplines 324 and 334 route. Therefore the combiner structure, 304, sees the two incoming signal feeds out of phase (180 degrees apart).

Figure 9:
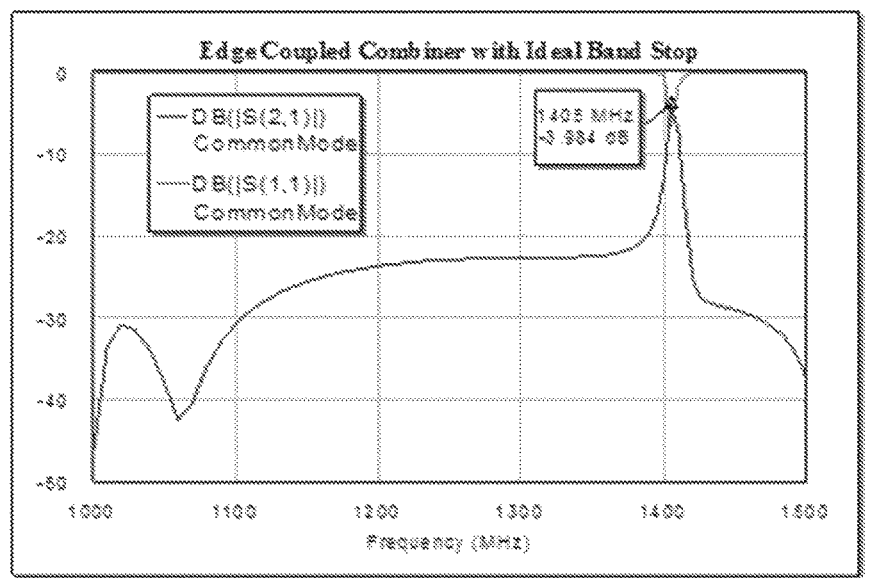
FIG. 9 is a diagram illustrating the spectral response of the system shown in FIG. 8 over a frequency range of 1000 to 1500 MHz.

FIG. 9 is a diagram illustrating the spectral response of the system shown in FIG. 8 over a frequency range of 1000 to 1500 MHz. Note that this is not an optimized configuration, but is provided to illustrate the concept of the example TRAJS/R using triple line edge coupled microstrips.

1.4.3 Microstrip Line Ring-Based

Figure 10:
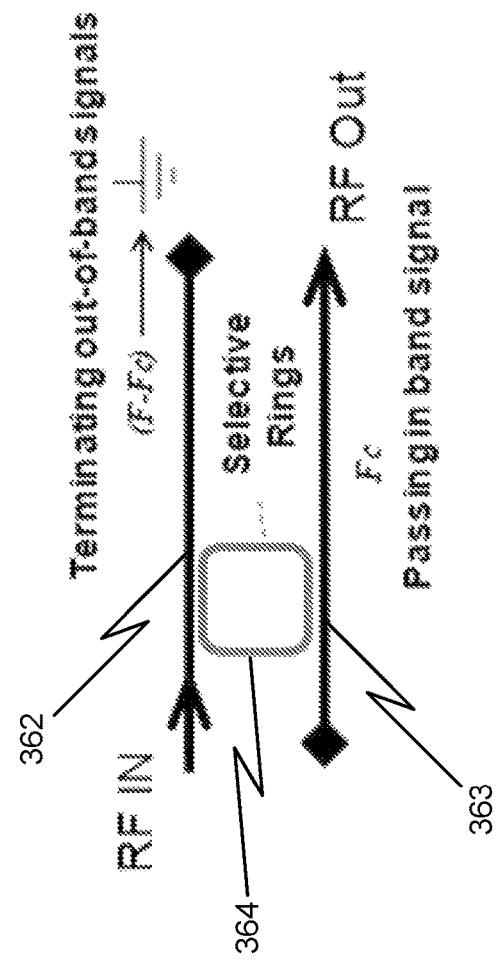
FIG. 10 is a diagram illustrating an example of pass band transmission using a ring resonator structure in accordance with one embodiment of the systems and methods described herein.

In FIG. 10 an example of pass band transmission using a ring resonator structure is presented. The rings based approach has an equivalent structure to notch filter, except it can be configured to offer pass band performance when the ring resonates at the pass band frequency, as shown in FIG. 8. In this embodiment, the input signal RF IN is coupled from signal path 362 to signal path 363 by frequency selective ring resonator(s) 364.

1.4.4 Coplanar-Based

Figure 11:
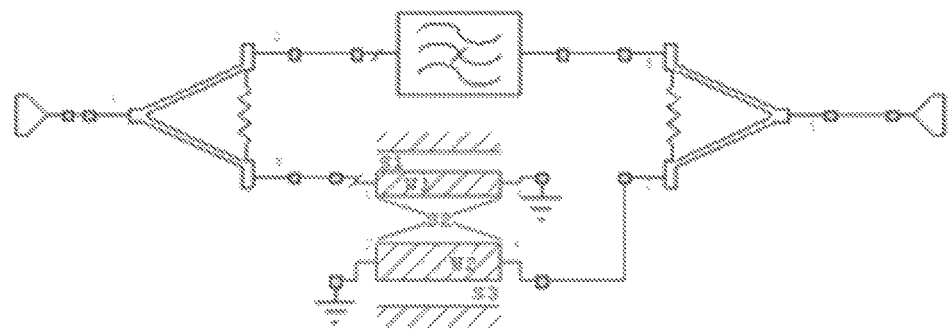
FIG. 11 is a diagram illustrating an example band pass structure phase inverter structure constructed using a microstrip/coplanar configuration in accordance with one embodiment of the systems and methods described herein.
Figure 12:
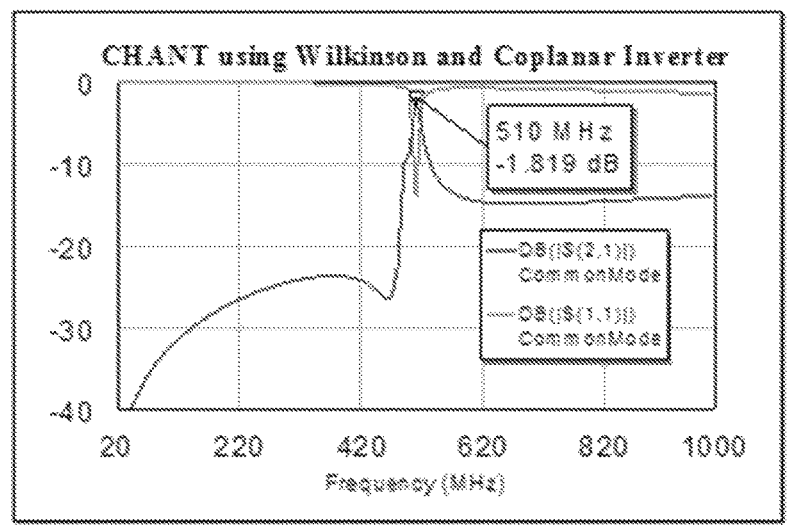
FIG. 12 is a diagram illustrating a circuit simulation of the example in FIG. 11, confirming the concept showing 1.8 dB-insertion loss.

In various embodiments, phase inverter structure and the combiner can be constructed using a microstrip/coplanar configuration. An example of this is shown in FIG. 11. As shown in FIG. 11, this example uses two parallel or substantially parallel striplines W1, W2, separated by a dielectric material. The striplines W1, W2 are chosen at such a length so as to induce a 180-degree phase shift. FIG. 12 illustrates a circuit simulation of the example in FIG. 11, confirming the concept showing 1.8 dB-insertion loss.

FIG. 11 is an example embodiment where a Wilkinson-based combiner such as that described in Section 1.4.1 is used with an edge-coupled structure for polarity inversion. As with the structure discussed in Section 1.4.2, coupling between shorted stub are used to realize the polarity inversion.

1.5 Noise Figure and EMI Packaging

The noise figure of the TRAJS/R system is a measure of degradation in the signal-to-noise ratio (SNR) between the input (connected to the antenna) and output (connected to signal transmitter/receiver). The random noise sets a lower limit on the minimum signal (at SIGINT, for example), and therefore minimizing the noise floor in the system allows a lower signal level. One major factor in noise control, reduction of insertion loss, can be addressed as described above in the previous sections. Another important figure intrinsic to the TRAJS/R is the isolation of active components located within the resonator rings rather than within the signal direct path. Based on Rayleigh-Jeans approximation, the noise voltage is: $V_n = \sqrt{4kTBR}$ where: k is the Boltzmann constant, T is temperature in Kelvin, R is impedance in Ohms, and B is the Bandwidth. The components of the TRAJS/R system that have the potential to increase the noise floor are a varactor and lumped elements. All of the components are coupled with the system transmission line via the ring resonators, which are narrowband at any given time. Therefore, given the narrow spectral support in ring resonators within TRAJS/R system configuration, the noise voltage is intrinsically contained, due to low B-value.

1.6 Systemic Approach

The majority of the embodiments are related to the TRAJS/R system configuration, and some of them to TRAJS/R system components, where letter "R" is related to reflective band pass filter. Therefore, the components used to make the tunable anti-jamming system can be selected using novel or conventional components. In particular, the novel system components are presented in Sections: 1.4.2, 1.4.3 and 1.4.4, while an implementation of the system with a novel combination of conventional components is discussed in Section 1.4.1.

Chapter 2. Activated Tunable RF Dual Band Band-Pass Filter (TRAJS/DB)

Some embodiments present an activated tunable Dual Band Band-Pass Filter, DB-Group (referred to herein as TRAJS/DB system). The TRAJS/DB filter system has the capability to be configured for multiband operation and to be further electronically tuned as well as deactivated. The filter system distributed structures form two resonators, controlled by tunable passive elements, corresponding to two pass bands (dualbands).

2.1 Filter Structure

Embodiments of the TRAJS/DB system are made using a cascade of hybrid (i.e., lumped and distributed) elements, which can be electronically tuned, for example, using variable capacitors. A Dual-Band Band-Pass Filter, or TRAJS/DB system, can be configured to be equivalent to two agile band pass filters which follow the (known) transmission scheme of the intentional interferer. By using a sharp roll-off factor band pass filter, embodiments of the system allow for interference mitigation of adjacent interferer signals.

The filter structure can be configured as a diversity-based filter that can be dynamically tuned (or pre-tuned) to several different frequency ranges or to the same frequency range. For instance, if the measurement of the interference shows a very strong narrow band characteristic, then all the filters may be tuned, similarly, against the narrowband interferer. Otherwise, they can be grouped to cover various bands. Furthermore, the multiband operation can be implemented by extending the resonator structures in series, and/or in parallel.

Figure 13:
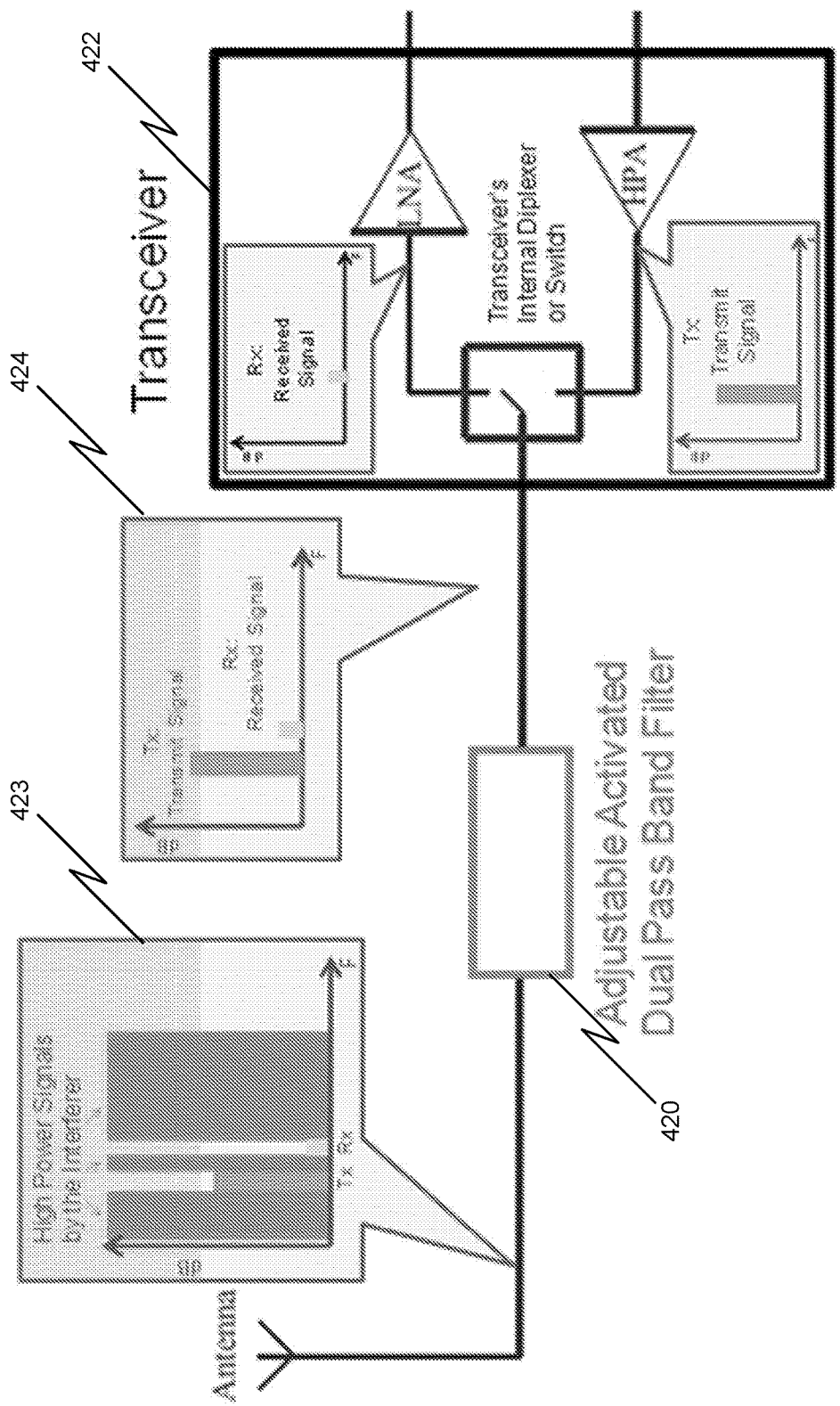
FIG. 13 is a diagram illustrating an example TRAJS/DB system. This example shows an adjustable activated dual pass-band filter located in front of the system transceiver and configured to block frequencies outside of the transmit and receive frequency bands.

FIG. 13 illustrates an example TRAJS/DB system. This example shows an adjustable activated dual pass band filter 420 located in front of the system transceiver 422 and configured to block frequencies outside of the transmit and receive frequency bands. Also shown in FIG. 13 are example signal spectra at three different points of the system for both transmitted and received signal. Spectrum 423 shows high power interference spikes surrounding the transmit and receive bands. Spectrum 424 shows the transmit and receive signals at their respective frequency bands.

2.2 Filter Input Output Coupling Structures

Figure 14:
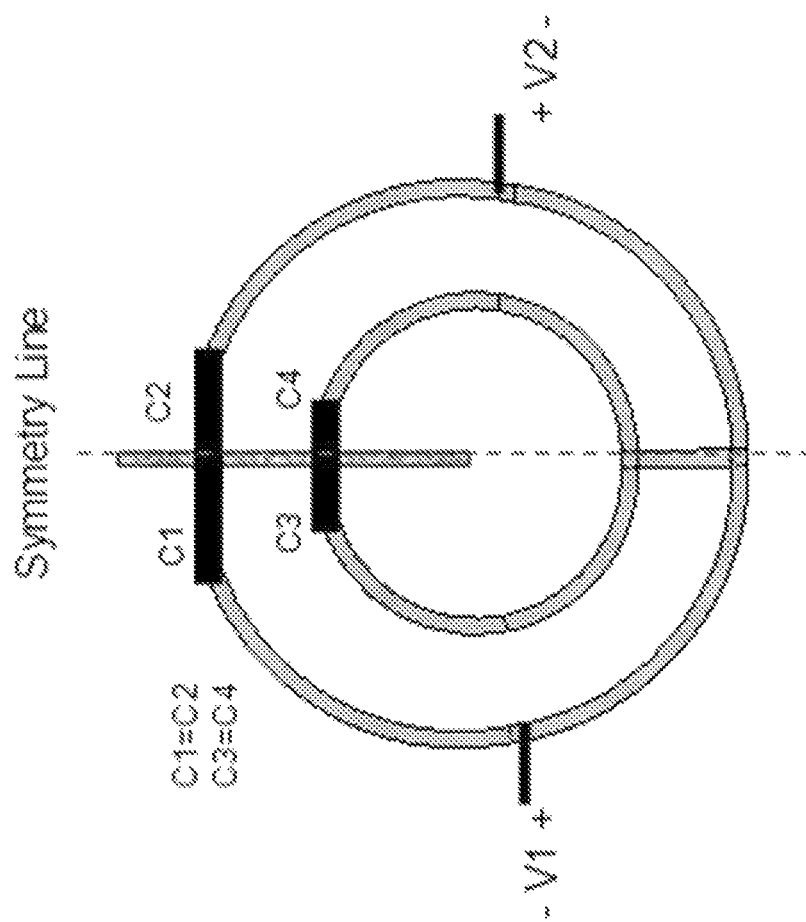
FIG. 14 is a diagram illustrating an example configuration using passive components in accordance with one embodiment of the technology described herein.

The dual-band filter can also be implemented using passive components. FIG. 14 is a diagram illustrating an example configuration using passive components in accordance with one embodiment of the technology described herein. In the example shown in FIG. 14, the tunable passive components are implemented as variable capacitors. The input and output coupling structures within the filter can be either those in the form of a coupled-line coupling as shown in FIG. 14, or a tapped-line coupling where the feed line is physically connected to the filter structure. In the 1$^{st}$ case, the removal of zero frequency (DC) within the filter response can be accomplished due to capacitance structure. In the tapped-line case, the filter structure should be implemented such that it is able to attenuate the zero frequency. On the other hand, the insertion loss of the 1$^{st}$ edge-coupled structure, is, in general, higher than that of the tapped-line structure.

2.3 Even and Odd Mode Excitations

The principle of operation of the filter structure is well described by symmetrical coupled line analysis, which takes the symmetry of the filter structure into account. According to the theory of coupled waves and transmission lines, the operation of the filter structure can use the superposition of even and odd mode excitations. In the even mode excitation case, the input and output voltages $V_1$ $V_2$, respectively, are both equal and in-phase. In the odd mode excitation case, $V_2$ and $V_1$ (as shown in FIG. 14) are equal in magnitude but reversed in phase, or of opposite polarity (180 degrees out of phase). When an even excitation is applied to the network input, $V_1$, the symmetrical interface is open-circuited, and the two network halves become the two identical one-port even-mode networks with the other port open-circuited. In the same vein, when an odd excitation is applied to the network input, $V_1$, the symmetrical interface is short-circuited, and the two networks halves become the two identical one-port, odd-mode networks, with the other port short-circuited.

Figure 15:
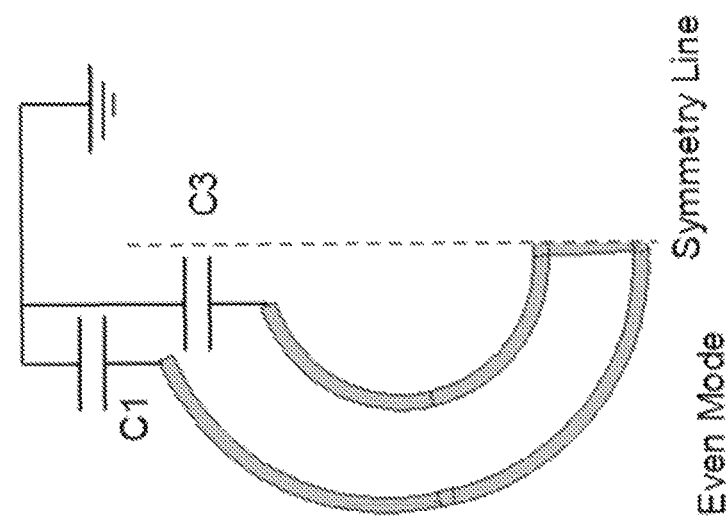
FIG. 15 illustrates an even-mode excitation of a filter structure (without input coupling ports) in accordance with one embodiment of the systems and methods described herein.
Figure 16:
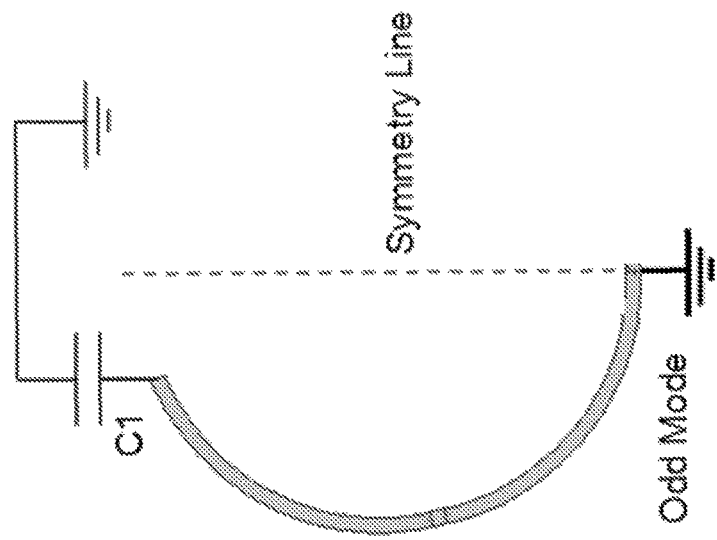
FIG. 16 illustrates an odd-mode excitation of a filter structure (without input coupling ports) in accordance with one embodiment of the systems and methods described herein.

An example of this is shown in FIGS. 15 and 16. In this example, FIG. 15 illustrates the even mode excitation; and FIG. 16 illustrates the odd mode excitation of the filter structure (without input coupling ports). According to FIGS. 15 and 16, the even excitation mode shares a portion of the odd excitation mode. Based on this observation, the coupled line in both modes can be simplified as shown in FIG. 17 (described below). For clarity of description, the lumped tunable components (as variable capacitors in FIG. 14 in the equivalent circuit are incorporated.

The LC equivalent circuit for the filter can be calculated based on FIG. 17 by substituting the transmission lines according to Richard's transformation and by applying Kuroda identities for the stub in even mode excitation.

Figure 17C:
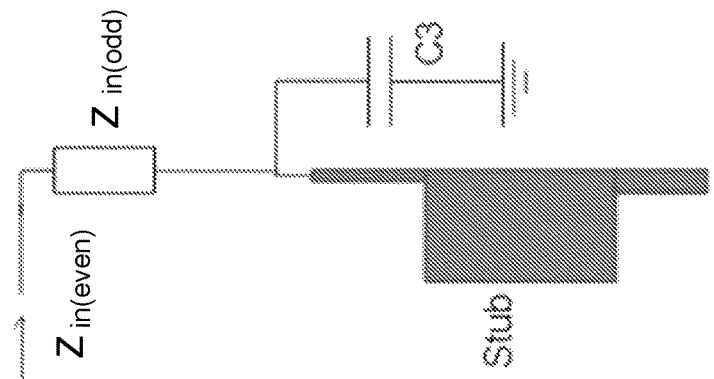
FIG. 17, which comprises FIGS. 17A, 17B and 17C, equivalent circuitry for even- and odd-mode excitations in accordance with one embodiment of the systems and methods described herein.
Figure 17B:
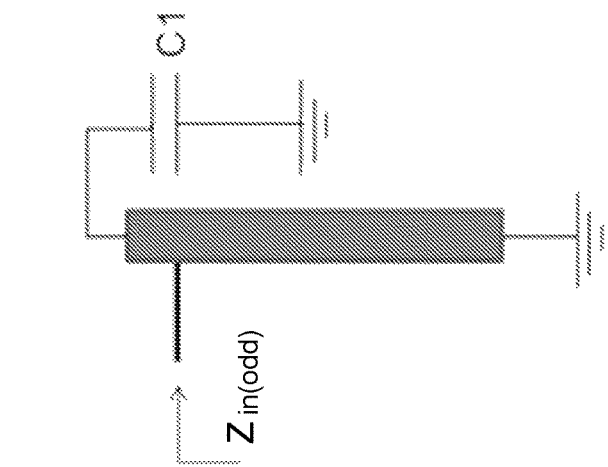
Figure 17A:
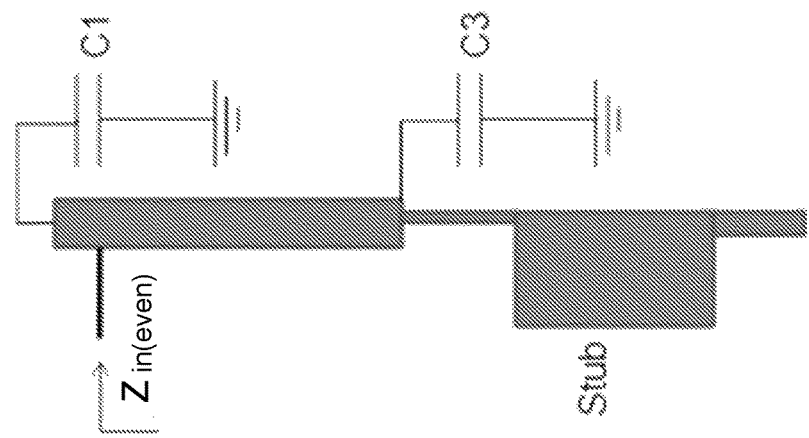

FIG. 17, which comprises FIGS. 17A, 17B and 17C, equivalent circuitry for even- and odd-mode excitations. FIG. 17A shows the input impedance of the even-mode excitation; FIG. 17B shows the input impedance of the odd-mode excitation; FIG. 17C shows the input impedance of the even-mode excitation incorporating the odd-mode impedance.

Figure 18A:
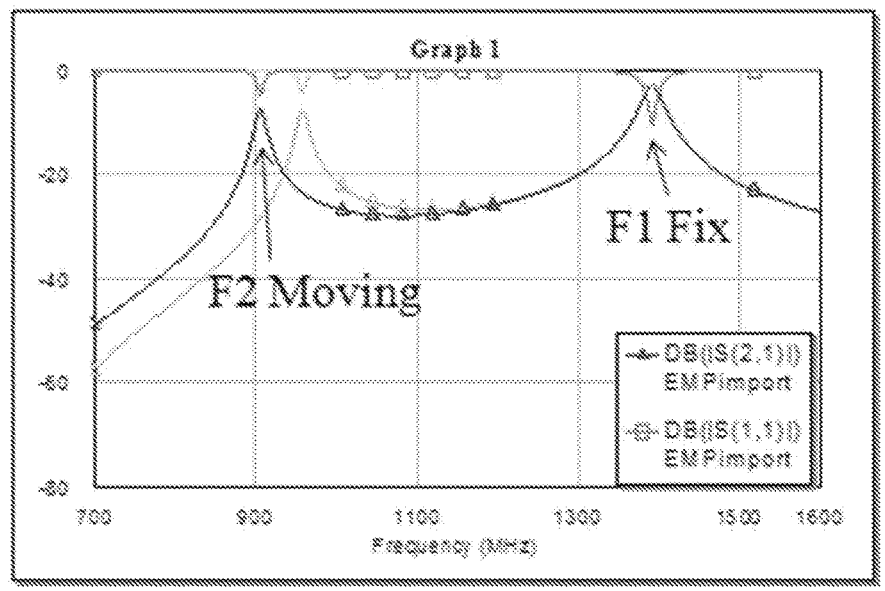
FIGS. 18A and 18B, illustrates a computer simulation (using Microwave Office/AWR simulation suite, for example) of the dual-band filter in accordance with one embodiment of the systems and methods described herein.
Figure 18B:
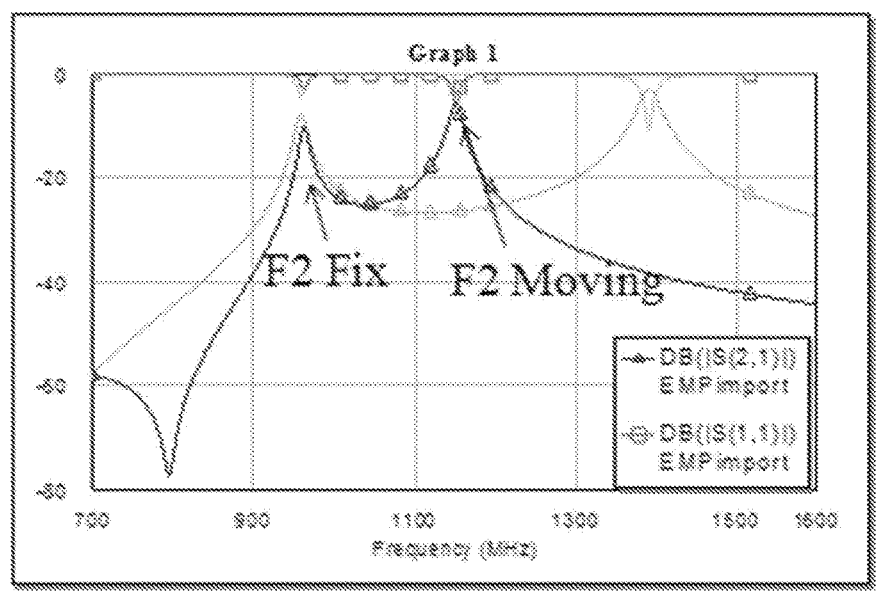

FIG. 18, which comprises FIGS. 18A and 18B, illustrates a computer simulation (using Microwave Office/AWR simulation suite, for example) of the dual-band filter. Particularly, FIG. 18 shows an example of the frequency response of the filter accomplished by adjusting the variable capacitors. As it is seen, the capacitor values can be configured in such a way that they exhibit independent tuning for both filters. FIG. 18A illustrates an example of the filter response by assuming: C1=C2 and C3=C4, where the higher band is fixed. FIG. 18B illustrates an example of the frequency response by tuning the higher band while keeping the lower band fixed. This is accomplished by variations of C1=C2 and C3=C4.

2.4 Controlling the Pass Bands

On advantages that may be accomplished by the equivalent circuit is in controlling the pass bands associated with the even and odd modes of operation. A microcontroller or other computer or processing system with analog outputs (or a D/A converter) may be is used to control the tunable elements to achieve desired filter characteristics. Then, a one-to-one mapping between the desired filter specifications (i.e., center frequencies, bandwidth of each filter, etc.) and in various embodiments the values for C1 and C3 can be tabulated in the memory of the digital system with respect to the required filter specifications. This look-up table approach is useful for producing desired filter characteristics.

Figure 19:
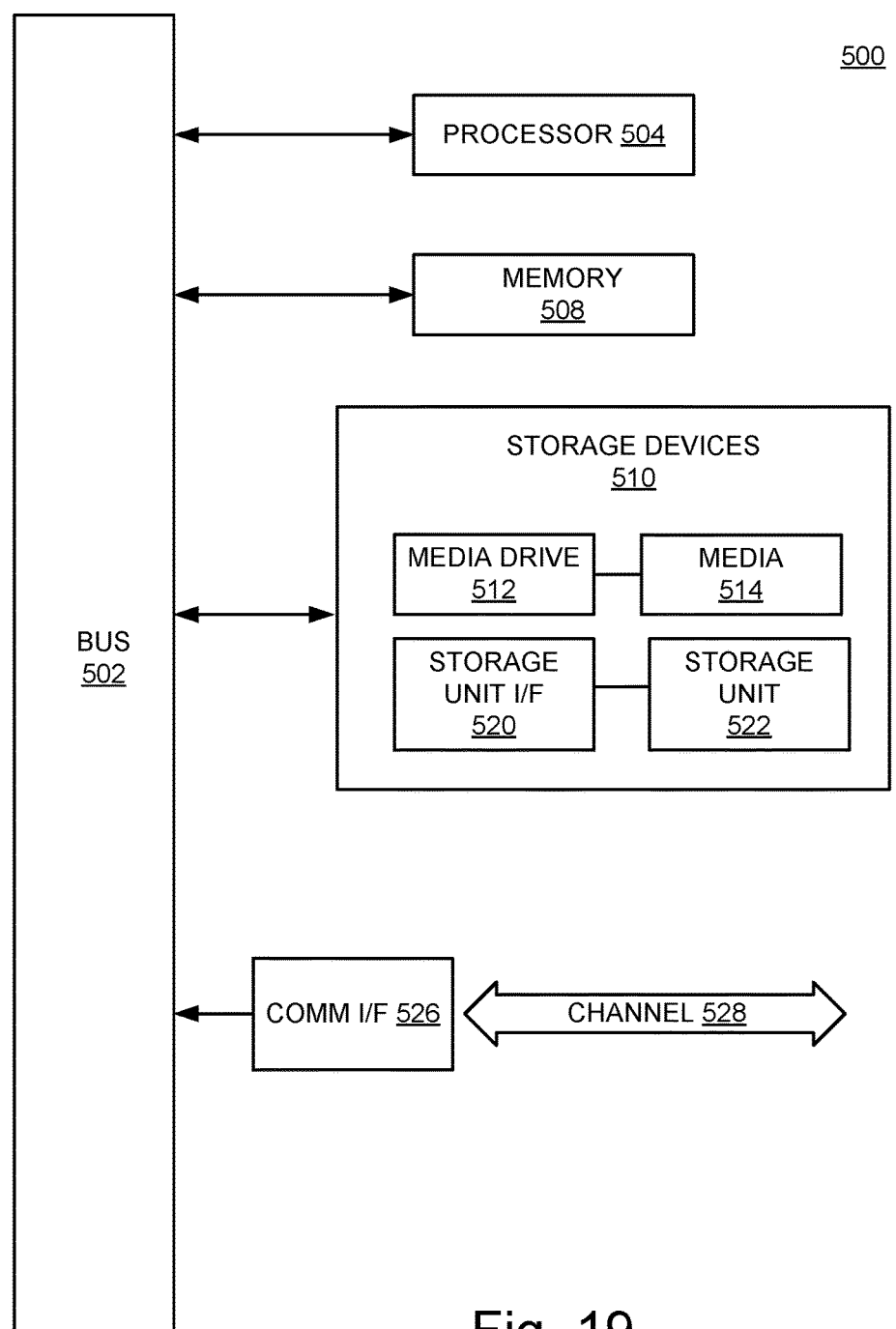
FIG. 19 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 19. Various embodiments are described in terms of this example-computing module 500. After reading this description, it will become apparent to a person skilled in the relevant art how to implement the technology using other computing modules or architectures.

Referring now to FIG. 19, computing module 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A tunable notch filter, comprising:
   a transmission line coupled to an antenna;
   a splitter having an input coupled to the transmission line and first and second outputs;
   a band-stop filter having an input coupled to the first output of the splitter and an output, the band-stop filter filtering a signal received by the antenna and coupled into the band-stop filter by the splitter, wherein in operation the band-stop filter suppresses predetermined frequency bands of the signal, thereby creating a filtered signal;
   a polarity inverter having an input coupled to the second output of the splitter and having an output, wherein in operation a phase inverter inverts a signal received by the antenna and coupled into the phase inverter by the splitter, thereby creating an inverted signal; and
   a combiner having a first input coupled to the output of the band-stop filter and a second input coupled to the output of the phase inverter, the combiner combining the filtered signal with the inverted signal to create a pass band signal comprising the predetermined frequency bands and suppressing frequency bands adjacent the predetermined frequency bands;
   wherein the splitter comprises a triple line edge-coupled stripline comprising:
      a first conductive stripline comprising a first end coupled to receive the signal received by the antenna and a second end connected to a ground;
      a second conductive stripline comprising a first end coupled to ground and a second end; and
      a third conductive stripline comprising a first end coupled to ground and a second end coupled to the input of the band-stop filter;
      wherein the first conductive stripline is disposed between and separated from the second and third striplines by a dielectric material.

2. The tunable notch filter of claim 1, further comprising a signal path electrically coupled between the first and second outputs of the splitter, wherein in operation the signal path passes a reflected signal reflected from the band-stop filter to the polarity inverter.

3. The tunable notch filter of claim 1, wherein the splitter comprises a 3 dB power divider and the combiner comprises a 3 dB power combiner.

4. The tunable notch filter of claim 1, wherein the splitter comprises a plurality of conductive striplines disposed substantially parallel to one another and separated from one another by a dielectric material.

5. The tunable notch filter of claim 1, wherein the triple line edge-coupled stripline comprises three conductive striplines arranged in a substantially parallel configuration and wherein a first of the three conductive striplines is disposed between and separated from the other two striplines by a dielectric material.

6. The tunable notch filter of claim 5, wherein the polarity inverter and the combiner together comprise a second triple line edge-coupled stripline, and wherein the second triple line edge-coupled stripline comprises:
   a fourth conductive stripline comprising a first end coupled to the second end of the second conductive stripline and a second end connected to a ground;
   a fifth conductive stripline comprising a first end coupled to ground and a second end coupled to output the pass band signal; and
   a sixth conductive stripline comprising a first end coupled to ground and a second end coupled to the output of the band-stop filter;
   wherein the fifth conductive stripline is disposed between and separated from the fourth and sixth striplines by a dielectric material.

7. The tunable notch filter of claim 1, wherein the polarity inverter comprises first and second substantially parallel striplines,
   the first stripline having a first end coupled to the second output of the splitter to receive the signal received by the antenna and a second end coupled to ground;
   the second stripline having a first end coupled to the second input of the combiner and a second end coupled to ground.

8. The tunable notch filter of claim 7, wherein the first and second substantially parallel striplines a length chosen to induce a 180 degree phase shift in the signal received at the first end of the first stripline.

9. The tunable notch filter of claim 7, further comprising a signal path electrically coupled between the first and second outputs of the splitter and a signal path electrically coupled between the first and second outputs of the combiner.

10. The tunable notch filter of claim 1, wherein the band-stop filter comprises an attenuating ring resonator and a selective ring resonator, each located adjacent to the transmission line.

11. The tunable notch filter of claim 10, wherein the attenuating ring resonator precedes the selective ring resonator, the attenuating ring resonator adapted to attenuate reflection signals, the selective ring resonator adapted to attenuate insertion signals associated with the predetermined frequency bands.

* * * * *